United States Patent [19]

Howard

[11] 3,846,541

[45] Nov. 5, 1974

[54] TREATMENT OF HYPERCHOLESTEREMIA

[75] Inventor: Alan Norman Howard, Cambridge, England

[73] Assignee: Pharmacia A/B, Uppsala, Sweden

[22] Filed: Mar. 20, 1973

[21] Appl. No.: 343,182

Related U.S. Application Data

[63] Continuation-in-part of Ser. No. 188,965, Oct. 13, 1971, abandoned.

[30] Foreign Application Priority Data

Oct. 15, 1970 Great Britain ............... 49140/70

[52] U.S. Cl. ................... 424/79, 424/308, 424/317
[51] Int. Cl. ........................................... A61k 27/00
[58] Field of Search .................... 424/79, 308, 310

[56] References Cited

UNITED STATES PATENTS

| | | | |
|---|---|---|---|
| 3,042,667 | 7/1962 | Flodin et al. | 260/209 |
| 3,277,025 | 10/1966 | Flodin et al. | 260/209 |
| 3,308,020 | 3/1967 | Wolf et al. | 424/331 |
| 3,383,281 | 5/1968 | Wolf et al. | 424/329 |
| 3,627,872 | 12/1971 | Parkinson | 424/79 |

FOREIGN PATENTS OR APPLICATIONS

| | | | |
|---|---|---|---|
| 860,303 | 2/1961 | Great Britain | 424/311 |

OTHER PUBLICATIONS

Jama, 8/11/69, Vol. 209, No. 6, p. 926.

J. of Lipid Research, Vol. 8, 1967, pp. 24–29.

*Primary Examiner*—Albert T. Meyers
*Assistant Examiner*—Norman A. Drezin
*Attorney, Agent, or Firm*—Roylance, Abrams, Berdo & Kaul

[57] ABSTRACT

Hypercholesteremia in humans is treated by daily administrations of (a) para-chlorophenoxyisobutyric acid or a simple functional derivative thereof which, under the influence of substances present in the gastric juices, serum or tissues of a human being, acts as a source of that acid and (b) a solid non-toxic anion exchange resin in the weight ratio of 1:2 to 1:20. The resin is a dextran-epichlorohydrin polymer in which 6–50 percent of the hydroxyl groups have been replaced by lower dialkylaminoalkoxy groups, a copolymer of tetraethylene pentamine and epichlorohydrin which contains quaternary ammonium groups or a styrene-divinyl-benzene copolymer containing quaternary ammonium groups. When present in the indicated weight ratios synergism exists between the para-chlorophenoxy isobutyric acid and the anion exchange resins.

12 Claims, 1 Drawing Figure

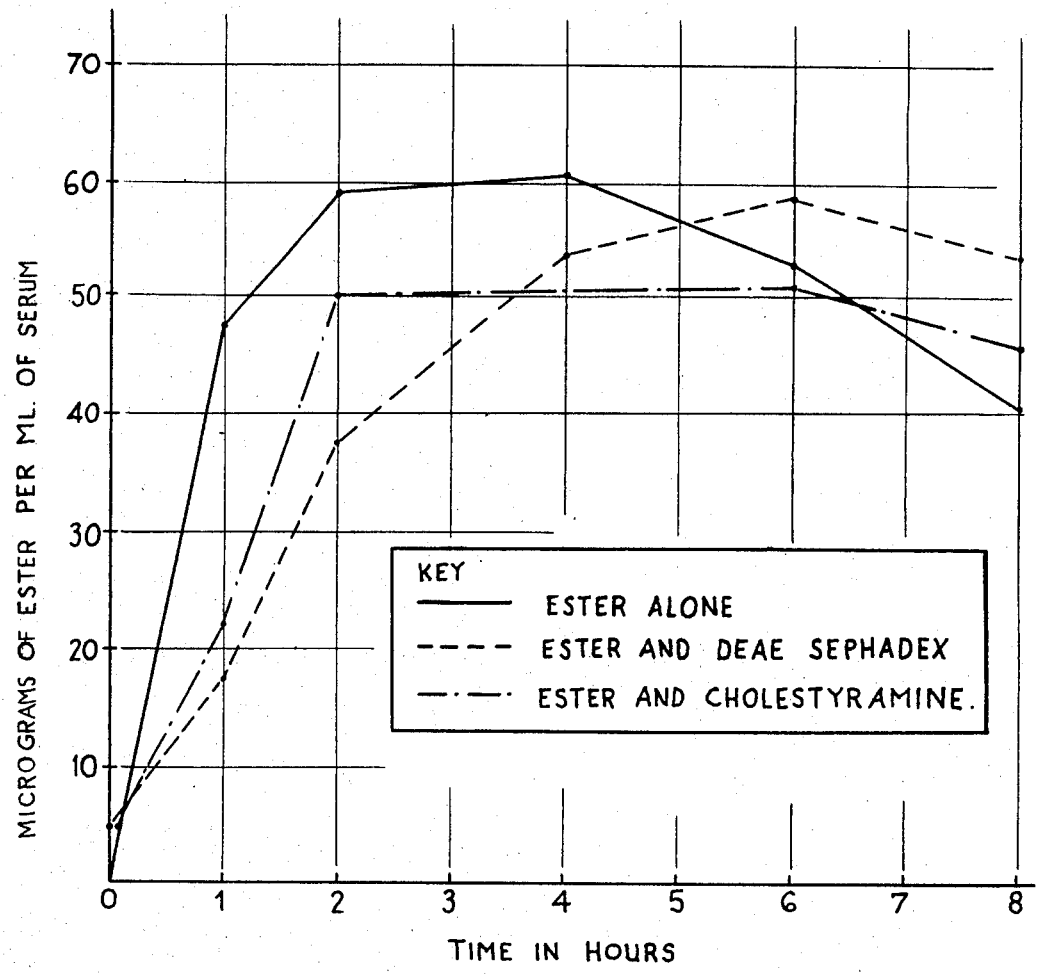

TREATMENT OF HYPERCHOLESTEREMIA

This application is a continuation-in-part of my application Ser. No. 188,965 filed Oct. 13, 1971 now abandoned.

This invention relates to the treatment of hypercholesteremia and to pharmaceutical compositions having marked hypocholesteremic activity.

It has long been known that certain diseases, such as coronary heart disease and atherosclerosis, may be caused by the presence of too high a cholesterol level in the blood plasma and there have been many attempts to provide a formulation, e.g., for oral administration, to reduce this cholesterol level.

It is an object of the present invention to provide an improved treatment and composition for use therein for reducing the cholesterol level of plasma.

According to one aspect of the present invention there is provided an admixture of (a) a pharmacologically acceptable grade of at least one compound having the general formula

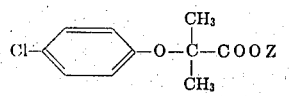

in which Z is a hydrogen atom, an ethyl group or an anion of a metal which is pharmacologically acceptable, and (b) a pharmacologically acceptable grade of certain basic non-toxic anion exchange resin which are described hereinafter. Metals which are pharmacologically acceptable are the alkali metals, the alkaline earth metals (including magnesium), aluminium, zinc and iron.

The compositions of the present invention have been found to act synergistically in producing a marked reduction in the cholesterol level in plasma.

The compounds having the general formula

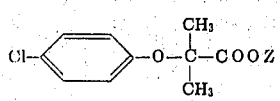

are derivatives of isobutyric acid which are described in British Pat. No. 860303. Preferred compounds of this type are alpha(para-chlorophenoxy)isobutyric acid, its ethyl ester, and the sodium, potassium, calcium, magnesium, zinc, aluminium and iron salts thereof.

The effective compound in the compositions and process of the present invention is the para-chlorophenoxyisobutyric acid. It is known (see, for example, Thorp, "The Lancet," issue of June 23, 1962, page 1325) that when the ethyl ester of para-chloroisobutyric acid is administered to man or to animals only low and transient levels of the ester can be detected in the blood or tissues. Esterases are present both in the blood and tissues which hydrolyse the ester to the corresponding acid which acid exists as such (and not in the form of salts such as alkali metal salts). Owing to the pH of the serum the acid is considered to be substantially wholly present in the ionised form. The acid is believed to be present almost wholly in the plasma and extracellular fluid.

When salts of para-chlorophenoxyisobutyric acid with pharmacologically acceptable metals are administered to man and animals conversion into the corresponding acid likewise takes place since para-chlorophenoxyisobutyric acid has been shown to be present in the plasma and it is apparent that this results from interaction of the gastric fluids with the salt administered followed by absorbtion of the resulting acid into the blood and distribution through the tissues. However it has been shown that in some cases, e.g., with the aluminium salt (see Ripoll, Daver, Thong, Podesta, du Pasquier and Ricoeur, Proceedings of the Third International Symposium on Drugs affecting Lipid Metabolism, Milano, Sept. 9–11th 1968) absorbtion takes place more slowly than in the case of the ethyl ester but the results are still due to presence of the acid.

Thus for the present purpose there may either be used para-chlorophenoxyisobutyric acid or a simple derivatives thereof which under the influence of substances present in the gastric juices, serum or tissues acts as a source of the free acid and the resulting free acid is then absorbed into the serum or tissues.

The basic non-toxic anion exchange resin is a solid resin in finely divided form which may be water-insoluble or may swell in the presence of water. It is preferred to use these resins in salt form, for example as a salt with a non-toxic inorganic acid such as hydrochloric acid, phosphorous acid or phosphoric acid. The resinous materials are used in fine particulate form and are preferably sieved so as to exclude oversize particles.

Three kinds of basic non-toxic anion exchange resin may be used in the compositions and treatment of the present invention. A particularly preferred type of resin consists of the omega-dialkylaminoalkyl, the omega-di(hydroxyalkyl)aminoalkyl and the omega-morpholino alkyl ethers of cross-linked polysaccharides, for example of dextran, starch and sucrose cross-linked with epichlorohydrin together with the non-toxic salts of such ethers with acids. The dextrans are anhydro-glucose polymers produced by the action of Leuconostoc mesenteroides upon aqueous solutions of sucrose. Preferred compounds are those containing 2-diethylaminoethyl, 2-dimethylaminoethyl, 2-diethylaminomethyl, di(hydroxyethyl)-aminoethyl, di(hydroxyethyl)aminomethyl, β-morpholinoethyl and α-morpholinomethyl groups. Such compounds are for example described in U.S. Pat. No. 3,277,025, together with their methods of production. The preferred salts of these compounds are the hydrochlorides.

These compounds are insoluble in water but swell therein and have a water regain of from 1 to 50 grams per gram of dry compound and have an ion exchange capacity of from 2 to 6 milliequivalents per gram of the dry compound.

In the case of dextran cross-linked with epichlorohydrin which is subjected to after treatment with diethylaminoethyl halide in the presence of an aqueous alkali such as caustic soda the product may be characterised as poly-[2(diethylamino)ethyl] polyglycerylene dextran.

A second type of basic non-toxic anion exchange resin which may be used in the compositions and treatment of the invention are the water-insoluble high molecular weight copolymers obtained from polyalkylene polyamines and epichlorohydrin, glycerol-1,3-dichlorohydrin or an aliphatic bis-epoxy compound such as 1,2: 3,4-bis-epoxybutane, bis-epoxypropyl ether or a bis-epoxypropyl ether of an alpha, omega-alkylene glycol. A preferred type of polyalkylene polyamine is a polyethylene polyamine and amongst the latter tetraethylene pentamine is the preferred material: such compounds contain at least as many secondary amino groups as primary amino groups in the molecule. The preferred product is a copolymer of tetraethylene pentamine and epichlorohydrin and may be regarded as a cross-linked polymer of these two substances which is brought to a pH of approximately 4 with hydrochloric acid, then dialysed and the dialysed product dried. In the reaction products a proportion of the amino groups are quaternised and form chloride salts.

A third type of basic non-toxic anion exchange resin is that in which basic groups have been introduced into a styrene polymer. Such a resin has a basis of a copolymer of styrene with a small proportion of divinylbenzene. The resulting copolymer is subject to chlormethylation and the product then treated with a tertiary amine, preferably a trialkylamine containing not more than 10 carbon atoms, so as to introduce quaternary ammonium groups. The styrene-divinylbenzene copolymer preferably contains not more than 5 percent, preferably 1–4 percent of divinylbenzene. The extent of chlormethylation and hence the proportion of quaternary groups can be varied over quite wide limits. Such products have an equivalent weight based upon the ammonium groups, of less than 500, usually of about 175–200.

As will be demonstrated hereinafter the admixture of the compounds of formula I with the above non-toxic anion exchange resins has a synergistic effect in the reduction of cholesterol values in human plasma. To obtain the synergistic advantage from the compositions it is preferred to use mixtures of resin to acid or derivative thereof in the proportions of from 20:1 to 2:1 by weight and more especially from 15:1 to 3:1 by weight. The most preferred ratio is 10:1 by weight.

Additional ingredients may be added to the compositions for special purposes. Thus the additional ingredient may be taurine or a substance which is metabolised in the form of taurine such as a salt of taurine with an acid; such substances facilitate the formation of taurine conjugates of bile acids which have a greater affinity for binding with anion exchange resins than glycine conjugates. Flavouring materials such as orange oil and synthetic sweeteners such as saccharine and saccharine sodium may also be added. Edible colouring matters may also be added. The compositions may also comprise a carrier, a faecal softener and/or a surfactant.

Resins of the above kinds are known to be capable of sequestering bile acids in the intestine and are then excreted in the faeces. However there is a wide variation amongst patients. The resins are, in any event, only moderately effective because the liver compensates to some degree by synthesizing more cholesterol.

The compounds having the general formula I are also known to be capable of lowering blood cholesterol levels by inhibiting cholesterol biosynthesis and increasing the efflux of cholesterol from the tissues into the faeces. The effect is however often very small (less than 10 percent reduction) or absent.

However when the said resins are admixed with compounds of formula I in weight proportions within the indicated range it has been found that a synergistic action occurs and there is a more marked reduction in blood cholesterol levels. Amongst the resins, particularly good results have been obtained with the diethylaminoethyl celluloses and dextrans which have been cross-linked with epichlorohydrin especially with the product DEAE Sephadex. Cholestyramine (which is a cross-linked styrene polymer containing quaternary ammonium groups) and colestipol (which is an anionic tetraethylene pentamine - epichlorohydrin copolymer product) were also effective. The anion exchange resins are not absorbed by the body but compounds having the formula I are absorbed and, as indicated above appear in the plasma serum and tissues in the form of the corresponding free acid. Experiments have shown that in the presence of the anion exchange resins considerable amounts of the free acid are absorbed — and the results are much more consistent — and it is considered possible that such absorption may be necessary for the observed lowering of the plasma cholesterol levels. Typical test results are appended.

TEST 1

Procedure

Patients were asked to continue on their normal diet, and blood was taken weekly after an overnight fast. After 2 weeks without treatment they were given either (a) DEAE Sephadex (5g three times daily), cholestyramine (5g three times daily), colestipol U–26597–A (5g three times daily) or (b) ethyl para-chlorophenoxy isobutyrate or para-chlorophenoxyisobutyric acid (500mg three times daily). In addition each resin (DEAE Sephadex, cholestyramine, or colestipol) was given simultaneously with the same ethyl ester or acid, the amounts being the same. After each 2 week treatment period there was a period of 2 weeks without treatment before the next treatment was started. Each sequence was carried out at random. Plasma cholesterol was determined by hydrolysis and digitonin precipitation (see Sperry and Webb, J. Biol. Chem. 1950, volume 187, page 97) and estimated by the ferric chloride-sulphuric acid method (Crawford, Clin, Chim, Acta, 1958, volume 3, page 357)

Ethyl para-chlorophenoxyisobutyrate and para-chlorophenoxyisobutyric acid were administered in equimolar amounts to all the patients participating in the tests.

The compound DEAE Sephadex is the cross-linked polymer of dextran and epichlorohydrin in which hydroxyl groups have been replaced by diethylaminoethoxy groups and the product quaternised with hydrogen chloride. Cholestipol is the previously described reaction of tetraethylene pentamine and epichlorohydrin which contains quaternary groups and cholestyramine is the previously described copolymer of styrene and divinylbenzene into which quaternary ammonium groups have been introduced.

It will be seen from Table I that on treatment with ethyl parachlorophenoxy isobutyrate a mean reduction of 6 percent in the serum cholesterol level was obtained and that three patients did not respond while two actually had an increase in serum cholesterol level during the treatment. When both ester and DEAE Sephadex were given the average reduction in serum cholesterol level was 33 percent and this included two of the patients who had not responded to the ester alone. The average reduction when DEAE Sephadex was given alone was 12 percent. Thus the average reduction when both DEAE Sephadex and ester were given was nearly twice the sum of their individual effects on the same patients.

TABLE I

Effect of ethyl p-chlorophenoxy isobutyrate (CPIB) and anion exchange resins on plasma cholesterol

| Treatment | CPIB | | DEAE Sephadex + CPIB | | DEAE Sephadex | | Cholestyramine + CPIB | | Cholestyramine | | Colestipol + CPIB | | Colestipol | |
|---|---|---|---|---|---|---|---|---|---|---|---|---|---|---|
| Time of Study (week) | 0 mg% | 2 Change % | 0 mg% | 2 Change % | 0 mg% | 2 Change % | 0 mg% | 2 Change % | 0 mg% | 2 Change % | 0 mg% | 2 Change % | 0 mg% | 2 Change % |
| Patient No. | | | | | | | | | | | | | | |
| 1 | 279 | 267 −4 | 300 | 188 −39 | 308 | 253 −15 | 320 | 257 −24 | 305 | 295 −3 | | | | |
| 2 | 208 | 182 −13 | 289 | 193 −33 | 200 | 189 −6 | | | | | | | | |
| 3 | 308 | 236 −23 | 275 | 135 −51 | 218 | 183 −16 | | | | | | | | |
| 4 | 248 | 183 −26 | 281 | 190 −32 | 262 | 274 +5 | | | | | | | | |
| 5 | 240 | 218 −9 | 245 | 174 −29 | 236 | 196 −17 | | | | | | | | |
| 6 | 261 | 262 0 | 230 | 185 −20 | 215 | 180 −16 | 278 | 203 −28 | 280 | 250 −11 | | | | |
| 7 | 204 | 227 +11 | 225 | 167 −26 | 233 | 204 −12 | 250 | 199 −20 | 240 | 210 −13 | | | | |
| 8 | 245 | 245 0 | 235 | 149 −37 | 224 | 184 −18 | 241 | 188 −22 | 250 | 225 −10 | | | | |
| 9 | 253 | 253 0 | | | | | 257 | 170 −34 | 235 | 200 −17 | | | | |
| 10 | 456 | 429 −6 | | | | | | | | | 441 | 317 −28 | 435 | 383 −12 |
| 11 | 300 | 293 −2 | | | | | | | | | 305 | 206 −32 | 327 | 250 −23 |
| 12 | 299 | 271 −9 | | | | | | | | | 290 | 182 −37 | 342 | 269 −21 |
| 13 | 314 | 292 −7 | | | | | | | | | 302 | 210 −30 | 299 | 266 −11 |
| 14 | 303 | 308 +2 | | | | | | | | | 321 | 221 −31 | 326 | 256 −21 |

TABLE II

Effect of para-chlorophenoxyisobutyric acid (CPIB acid) and anion exchange resins on plasma cholesterol

| Treatment | CPIB acid | | DEAE Sephadex + CPIB acid | | Cholestyramine + CPIB acid | | Cholestyramine | | Cholestipol + CPIB acid | | Cholestipol | |
|---|---|---|---|---|---|---|---|---|---|---|---|---|
| Time of study (week) | 0 mg% | 2 Change % | 0 mg% | 2 Change % | 0 mg% | 2 Change % | 0 mg% | 2 Change % | 0 mg% | 2 Change % | 0 mg% | 2 Change % |
| Patient No. | | | | | | | | | | | | |
| 15 | 310 | 301 −4 | 305 | 207 −32 | | | | | 310 | 220 −29 | 305 | 259 −15 |
| 16 | 305 | 275 −10 | 300 | 195 −35 | | | | | 295 | 210 −32 | 305 | 238 −12 |
| 17 | 285 | 262 −8 | 290 | 191 −33 | | | | | 285 | 200 −30 | 280 | 249 −11 |
| 18 | 265 | 266 0 | | | 275 | 206 −25 | 260 | 234 −10 | | | | |
| 19 | 290 | 290 0 | | | 285 | 228 −20 | 280 | 243 −13 | | | | |
| 20 | 300 | 294 −2 | | | 295 | 230 −22 | 290 | 258 −11 | | | | |

In the case of cholestyramine the average reduction is serum cholesterol was about 11 percent whilst when given admixed with the ester the average reduction was about 26 percent which is about 50 percent greater than the sum of the individual effects of the ester and the resin.

In the case of colestipol the average reduction in serum cholesterol was 18 percent whilst when given admixed with the ester the average reduction was 32 percent which is about 45 percent greater than the sum of the individual effects of the ester and the resin.

From Table II it is apparent that on treatment with para-chlorophenoxyisobutyric acid a mean reduction of 4 percent in the serum cholesterol level was obtained but that one-third of the patients did not respond at all. When CPIB acid and DEAE Sephadex were given the average reduction in the serum cholesterol level was again 33 percent. The average in patients treated with DEAE Sephadex alone is seen from Table I to be 12 percent and thus the average reduction when using DEAE Sephadex and CPIB acid was substantially twice the sum of the average individual effects on patients. It is also evident that the results obtained with CPIB acid and its ethyl ester are closely comparable. In consequence it is clear that the results obtained are due to the synergistic action of CPIB acid and the ion-exchange resin.

In the results obtained with cholestyramine alone the average reduction in serum cholesterol was again about 11 percent whilst when CPIB acid was given together with cholestyramine the average reduction was about 22 percent which is nearly 50 percent greater than the sum of the individual effects of the acid and the resin.

In the case of cholestipol the average reduction in serum cholesterol was nearly 13 percent whilst when given together with CPIB acid the average reduction was greater than 30 percent which is about 76 percent greater than the sum of the individual effects of CPIB acid and the resin.

TEST 2

Procedure

Six patients were given 500 mg of ethyl para-chlorophenoxyisobutyrate per os and blood samples taken periodically up to 8 hours from administration. The concentration of the para-chlorophenoxyisobutyric acid in the serum was determined by extracting the acidified serum with a mixture of iso-octane ethanol (95:5 v/v) and determining its adsorption at a wavelength of 280 m$\mu$. The same six patients were given 500 mg of ethyl parachlorophenoxy isobutyrate and 5g of DEAE Sephadex or 5g of cholestyramine. The para-chlorophenoxyisobutyric acid in the serum was determined as before. The results obtained were used to prepare a graph which constitutes the accompanying drawing; it will be seen that the ester was readily absorbed in the presence of the resins, and that the serum levels of para-chlorophenoxyisobutyric acid rose to almost the same maximum as that attained using the ester alone. However, the time taken to reach this value was delayed by up to 4 hours, and adsorption of the ester was somewhat slower. High levels of para-chlorophenoxyisobutyric acid concentration are maintained for a long time in the presence of the resins.

Additional experiments have been carried out using para-chlorophenoxyisobutyric acid or ethyl para-chlorophenoxyisobutyrate and the three named resins in different proportions from those used in the above tests and within the range 1:2 to 1:20 and throughout evidence, similar to that given above, has been obtained of the existence of the described synergistic effect between the source of para-chloroisobutyric acid and the resins named.

With respect to the treatment of patients suffering from hypercholesteremia it is recommended that a patient received from 3.0 grams to 50.0 grams per day, preferably from 10.0 grams to 25.0 grams of the compositions. Administration is preferably in three substantially equal doses dispersed in an aqueous medium.

The following examples illustrate the compositions of the present invention.

EXAMPLE 1

Mixture of a powder and a liquid.

| | |
|---|---|
| DEAE Sephadex hydrochloride powder | 100g |
| ethyl para-chlorophenoxyisobutyrate | 10g |
| gum arabic powder | 25g |
| flavouring | 5g |

The ester is gradually admixed with a small amount of the resin and the remainder of the resin, gum arabic and flavour gradually worked in. Such a formulation for oral use is given three times daily with meals in doses of 6.7g, contained in a packet, or in a measuring spoon (the mixture being supplied in a jar with a suitable spoon). The mixture is emptied and stirred into water, fruit or vegetable juices, skimmed milk, or mixed with cereal or other food.

EXAMPLE 2

Mixture of a powder and micro-encapsulated liquid.

| | |
|---|---|
| DEAE Sephadex hydrochloride powder | 100g |
| ethyl parachlorophenoxyisobutyrate (micro-encapsulated) | 10g |
| gum arabic powder | 25g |
| flavouring | 5g |

Because the ethyl ester has an unpleasant taste, it is conveniently mixed with the other components in the form of microcapsules. The ethyl ester is micro-encapsulated to give a pore size of about 150 microns and then mixed with the other ingredients.

EXAMPLE 3

Mixture of powders.

| | |
|---|---|
| Colestipol (U-2659A) | 100g |
| sodium salt of para-chlorophenoxyisobutyric acid | 5g |
| gum arabic powder | 25g |
| flavouring | 5g |

The flavouring and gum arabic are first admixed and the other ingredients, in powder form, gradually admixed therewith. Such a formulation for oral use is given as described in Example 1.

EXAMPLE 4

Mixture of powders and a third component which may potentiate activity.

| | |
|---|---|
| Cholestyramine powder | 100g |
| para-chlorophenoxyisobutyric acid | 10g |
| taurine | 40g |
| gum arabic powder | 25g |
| flavouring | 5g |

The mixing procedure is the same as in Example 3. The mixture for oral use is given thrice daily in doses of 9g each, mixed with water before taking.

In the above example the para-chlorophenoxyisobutyric acid may be replaced by an equivalent amount of its sodium, potassium, calcium or aluminium salt.

EXAMPLE 5

Tablet.

| | |
|---|---|
| Colestipol (U-26597A) powder micronised | 1,000g |
| para-chlorophenoxyisobutyric acid | 150g |
| methyl cellulose U.S.P. | 65g |
| Talc | 30g |
| Calcium stearate | 10g |

The colestipol, talc and acid are mixed well, granulated with a 7.5 percent solution of methyl cellulose in water, passed through a No. 8 screen and dried carefully. The dried granules are passed through a No. 12 screen, mixed with the stearate and compressed into 1,000 tablets. Three tablets for oral use are chewed and swallowed four times a day with meals.

EXAMPLE 6

Hard gelatin capsules.

| | |
|---|---|
| DEAE Sephadex hydrochloride powder | 100g |
| ethyl para-chlorophenoxyisobutyrate | 10g |
| Talc U.S.P. | 10g |
| Magnesium stearate U.S.P. | 0.5g |

The finely powdered ingredients are thoroughly mixed and then filled into hard gelatin capsules, for oral use, each containing about 500mg mixture. Five capsules are taken four times a day with meals.

What I claim is:

1. A method of treating patients suffering from hypercholesteremia which comprises the daily oral administration thereto of a hypocholesteremic effective amount of a composition comprising (a) a compound selected from the group consisting of para-chlorophenoxyisobutyric acid, the ethyl ester of said acid and salts of said acid with pharmacologically acceptable metals and (b) a pharmacologically acceptable grade of a solid non-toxic anion exchange resin in the weight ratio of 1:2 to 1:20, said resin being selected from the group consisting of (i) the solid copolymer of dextran and epichlorohydrin having from 10–35 percent of its weight of hydroxyl groups, based upon the dry substance, from 6–50 percent of said hydroxyl groups having been replaced by groups of the formula RYO- in which Y is an alkylene group having at least one but less than three carbon atoms and R is a dialkylamino group having at least two but less than five carbon atoms, said copolymer having an ion exchange capacity of 2–6 milliequivalents per gram of dry compound (ii) the solid copolymer of tetraethylene pentamine and epichlorohydrin which has been brought to a pH of approximately 4 and then dried, and (iii) a solid styrene-divinylbenzene copolymer containing not more than 5 percent by weight of divinyl-benzene into which quaternary alkylammonium groups containing not more than 10 carbon atoms have been introduced, which copolymer has an equivalent weight, based upon the ammonium groups of less than 500, said anion exchange resins being administered in an overall daily amount of 3 to 50 grams.

2. The method of claim 1 in which the weight ratio of said compound to said anion exchange resins is 1:3 to 1:15 by weight.

3. The method of claim 1 in which the weight ratio of said compound to said anion exchange resin is substantially 1:10 by weight.

4. The method of claim 1 in which a patient receives of said compound and said anion exchange resin a total weight of 3.0 to 50.0 grams per day.

5. The method of claim 1 in which a patient receives of said compound and said anion exchange resin a total weight of 10.0 to 25.0 grams per day.

6. The method of claim 1 in which said compound is ethyl para-chlorophenoxyisobutyrate.

7. The method of claim 1 in which said compound is aluminium para-chlorophenoxyisobutyrate.

8. A pharmaceutical composition useful for the treatment of hypercholesteremia comprising, an effective amount of an admixture (a) a compound selected from the group consisting of para-chlorophenoxyisobutyric acid, the ethyl ester of said acid and salts of said acid with pharmacologically acceptable metals and (b) a pharmacologically acceptable grade of a solid non-toxic anion exchange resin in the weight ratio of 1:2 to 1:20, with resin being selected from the group consisting of (i) the solid copolymer of dextran and epichlorohydrin having from 10–35 percent of its weight of hydroxyl groups, based upon the dry substance, from 6–50 percent of said hydroxyl groups having been replaced by groups of the formula RYO- in which Y is an alkylene group having at least one but less than three carbon atoms and R is a dialkylamino group having at least two but less than five carbon atoms, said copolymer having an ion exchange capacity of 2–6 milliequivalents per gram of dry compound (ii) the solid copolymer of tetraethylene pentamine and epichlorohydrin which has been brought to a pH of approximately 4 and then dried, and (iii) a solid styrene-divinylbenzene copolymer into which quaternary alkyl-ammonium groups containing not more than 10 carbon atoms have been introduced, which copolymer has an equivalent weight, based upon the ammonium groups of less than 500.

9. The composition of claim 8 in which said compound and said anion exchange resin are respectively present in the weight ratios of 1:3 to 1:15.

10. The composition of claim 8 in which said compound and said anion exchange resin are respectively present in the weight ratios of substantially 1:10.

11. The composition of claim 8 in which said compound is ethyl para-chlorophenoxyisobutyrate.

12. The composition of claim 8 in which said compound is aluminium para-chlorophenoxyisobutyrate.

* * * * *